US007478042B2

(12) United States Patent

Ehara et al.

(10) Patent No.: US 7,478,042 B2

(45) Date of Patent: Jan. 13, 2009

(54) SPEECH DECODER THAT DETECTS STATIONARY NOISE SIGNAL REGIONS

(75) Inventors: Hiroyuki Ehara, Yokohama (JP); Kazutoshi Yasunaga, Kyoto (JP); Kazunori Mano, Musashino (JP); Yusuke Hiwasaki, Musashino (JP)

(73) Assignee: Panasonic Corporation, Osaka (JP)

( * ) Notice: Subject to any disclaimer, the term of this patent is extended or adjusted under 35 U.S.C. 154(b) by 908 days.

(21) Appl. No.: 10/432,237

(22) PCT Filed: Nov. 30, 2001

(86) PCT No.: PCT/JP01/10519

§ 371 (c)(1),
(2), (4) Date: May 22, 2003

(87) PCT Pub. No.: WO02/45078

PCT Pub. Date: Jun. 6, 2002

(65) Prior Publication Data

US 2004/0049380 A1 Mar. 11, 2004

(30) Foreign Application Priority Data

Nov. 30, 2000 (JP) ............................ 2000-366342

(51) Int. Cl.

*G10L 11/06* (2006.01)
*G10L 19/12* (2006.01)
*G10L 15/00* (2006.01)
*G10L 21/00* (2006.01)

(52) U.S. Cl. ....................... 704/233; 704/215; 704/223; 704/226; 704/227

(58) Field of Classification Search ................ 704/223, 704/233
See application file for complete search history.

(56) References Cited

U.S. PATENT DOCUMENTS

| | | | | |
|---|---|---|---|---|
| 3,940,565 A * | 2/1976 | Lindenberg | ................. | 704/253 |
| 4,597,098 A * | 6/1986 | Noso et al. | .................. | 704/233 |
| 4,897,878 A * | 1/1990 | Boll et al. | .................. | 704/233 |
| 4,899,385 A * | 2/1990 | Ketchum et al. | ............ | 704/223 |
| 5,073,940 A * | 12/1991 | Zinser et al. | ................ | 704/226 |
| 5,127,053 A * | 6/1992 | Koch | .......................... | 704/207 |

(Continued)

FOREIGN PATENT DOCUMENTS

EP 1024477 8/2000

(Continued)

OTHER PUBLICATIONS

Yuriko et al. JP9054600 (English Machine Translation).*

(Continued)

*Primary Examiner*—David R Hudspeth
*Assistant Examiner*—Justin W Rider
(74) *Attorney, Agent, or Firm*—Dickinson Wright, PLLC

(57) ABSTRACT

A first determiner 121 tentatively determines whether the current processing unit represents a stationary noise period, based on stationary properties of a decoded signal. Based on the tentative determination result and a determination result of the periodicity of the decoded signal, a second determiner 124 determines whether the current processing unit represents a stationary noise period, thereby distinguishing a decoded signal including a stationary speech signal such as a stationary vowel from stationary noise and correctly identifying the stationary noise period.

6 Claims, 12 Drawing Sheets

U.S. PATENT DOCUMENTS

| | | | | | |
|---|---|---|---|---|---|
| 5,231,692 | A | * | 7/1993 | Tanaka et al. | 704/200 |
| 5,450,449 | A | * | 9/1995 | Kroon | 375/350 |
| 5,757,937 | A | * | 5/1998 | Itoh et al. | 381/94.3 |
| 6,104,992 | A | * | 8/2000 | Gao et al. | 704/220 |
| 2001/0029451 | A1 | | 10/2001 | Matsuoka et al. | |

FOREIGN PATENT DOCUMENTS

| | | |
|---|---|---|
| JP | 02146100 | 6/1990 |
| JP | 05265496 | 10/1993 |
| JP | 06222797 | 8/1994 |
| JP | 7143075 | 6/1995 |
| JP | 08202398 | 8/1996 |
| JP | 08254998 | 10/1996 |
| JP | 954600 | 2/1997 |
| JP | 09044195 | 2/1997 |
| JP | 10020896 | 1/1998 |
| JP | 10207419 | 8/1998 |
| JP | 11175083 | 7/1999 |
| JP | 2000099096 | 4/2000 |
| JP | 2000235400 | 8/2000 |
| JP | 2001222298 | 8/2001 |
| WO | 0034944 | 6/2000 |

OTHER PUBLICATIONS

European Search Report dated Aug. 31, 2005.

Japanese Office Action dated Nov. 15, 2005 with English translation.

English translation of PCT International Preliminary Examination Report dated Nov. 18, 2002.

PCT International Search Report dated Mar. 5, 2002.

M.R. Schroeder, et al.; "Code-Excited Linear Prediction (CELP): High-Quality Speech At Very Low Bit Rates," Proc.ICASSP-85,25. 1.1, pp. 937-940, 1995.

* cited by examiner

| |
|---|
| VARIATION AMOUNT (DIFFERENCE) IN SMOOTHED DECODED LSP BETWEEN SUBFRAMES<br>EXAMPLE OF INITIAL VALUES :0 |
| DISTANCE BETWEEN SMOOTHED DECODED LSP AND AVERAGE LSP OF STATIONARY NOISE REGION<br>EXAMPLE OF INITIAL VALUES :0 |
| COUNTER OF SUBFRAME DETERMINED AS STATIONARY NOISE REGION<br>INITIAL VALUE : 0 |
| COUNTER INDICATIVE OF THE NUMBER OF SUCCESSIVE SUFRAMES WHICH ARE NOT SPEECH STATIONARY AND IN WHICH THE VARIATION AMOUNT IN DECODED LSP BETWEEN SUBFRAMES IS SMALL |
| COUNTER INDICATIVE OF THE NUMBER OF SUCCESSIVE SUBFRAMES DETERMINED AS SPEECH REGION<br>INITIAL VALUE : 0 |
| AVERAGE SIGNAL POWER OF NOISE REGION INITIAL VALUE : 0 |
| THE NUMBER OF CLASSES INDICATIVE OF THE NUMBER OF TYPES OF PITCHES APPEARING DURING A PREDETERMINED NUMBER OF PREVIOUS SUFRAMES EXAMPLE OF INITIAL VALUES : 1 |
| SCALING COEFFICIENT SMOOTHED FOR EACH SAMPLE EXAMPLE OF INITIAL VALUES :0 |
| SMOOTHING PITCH GAIN EXAMPLE OF INITIAL VALUES :0.4 |
| HANGOVER COUNTER (FOR SPEECH REGION DETERMINATION) EXAMPLE OF INITIAL VALUES :20 |
| SCALING COEFFICIENT FOR GAIN ADJUSTMENT OF STATIONARY NOISE TO BE ADDED<br>EXAMPLE OF INITIAL VALUES : 1 |
| POWER OF SYNTHESIZED STATIONARY NOISE SIGNAL OF THE LAST SUBFRAME EXAMPLE OF INITIAL VALUES :0 |
| STATE OF STATIONARY NOISE SYNTHESIS FILTER INITIAL VALUE : 0 |
| MODE DETERMINATION RESULT OF LAST SUBFRAME<br>EXAMPLE OF INITIAL VALUES :STATIONARY NOISE MODE |
| FINAL SCALING COEFFICIENT OF LAST SUBFRAME EXAMPLE OF INITIAL VALUES :0 |
| HANGOVER COUNTER FOR FRAME ERASURE CONCEALMENT PROCESSING INITIAL VALUE : 0 |

FIG. 9

SPEECH DECODER THAT DETECTS STATIONARY NOISE SIGNAL REGIONS

TECHNICAL FIELD

The present invention relates to a speech decoding apparatus that decodes speech signals encoded at low bit rates in a mobile communication system and packet communication system (e.g. internet communication system). More particularly, the present invention relates to a CELP (Code Excited Linear Prediction) speech decoding apparatus that divides speech signals into the spectrum envelope component and the residual component.

BACKGROUND ART

In mobile communications, packet communications (e.g., internet communications) or speech storage, speech coding apparatuses are used for compressing speech information by using efficient encoding. This is for effective use of the capacity of transmission layer resources like radio frequencies or the capacity of storage media. Among those, systems based on the CELP (Code Excited Linear Prediction) system are carried into practice widely at medium and low bit rates. Techniques of CELP are described in M. R. Schroeder and B. S. Atal: "Code-Excited Linear Prediction (CELP): High-quality Speech at Very Low Bit Rates", Proc. ICASSP-85, 25.1.1, pages 937-940, 1985.

According to the CELP speech coding system, speech is divided into frames of a certain length (about 5 ms to 50 ms), linear prediction analysis is performed for each frame, and the prediction residual (i.e. excitation signal) from the linear prediction analysis is encoded using an adaptive code vector and a fixed code vector having the shapes of prescribed waveforms. The adaptive code vector is selected from an adaptive codebook that stores excitation vectors produced earlier. The fixed code vector is selected from a fixed codebook that stores a prescribed number of vectors of prescribed shapes. The fixed code vectors stored in the fixed codebook include random vectors and vectors produced by combining several pulses.

A prior-art CELP coding apparatus performs LPC (Liner Predictive Coefficient) analysis and quantization, pitch search, fixed codebook search and gain codebook search, using input digital signals, and transmits the LPC code (L), pitch period (A), fixed codebook index (F) and gain codebook index (G), to the decoding apparatus.

The decoding apparatus decodes the LPC code (L), pitch period (A), fixed codebook index (F) and gain codebook index (G), and, based on the decoding results, applies an excitation signal to a synthesis filter and produces the decoded signal.

However, with the prior-art speech decoding apparatus, it is difficult to distinguish signals that are stationary but are not noisy (e.g. stationary vowels) from stationary noise and identify a stationary noise period.

DISCLOSURE OF INVENTION

It is therefore an object of the present invention to provide a speech decoding apparatus that correctly identifies the stationary noise signal period and decodes speech signals. To be more specific, it is an object of the present invention to provide a speech decoding apparatus and speech decoding method for identifying the speech period and the non-speech period, distinguishing periodic stationary signals from stationary noise signals (e.g. white noise) using the pitch period and adaptive code gain, and correctly identifying the stationary noise signal period.

To achieve the object, the present invention proposes an apparatus and method for tentatively evaluating the properties of stationary noise of a decoded signal, determining whether the current processing unit represents a stationary noise period based on the tentatively evaluated stationary noise properties and the periodicity of the decoded signal, separating the decoded signal containing stationary speech signal such as stationary vowels from stationary noise, and correctly identifying the stationary noise period.

BRIEF DESCRIPTION OF DRAWINGS

FIG. 9 is a diagram showing examples of memories provided in the speech decoding system and of initial values of the memories;

BEST MODE FOR CARRYING OUT THE INVENTION

Embodiments of the present invention will be described below with reference to the accompanying drawings.

First Embodiment

Figure 1:
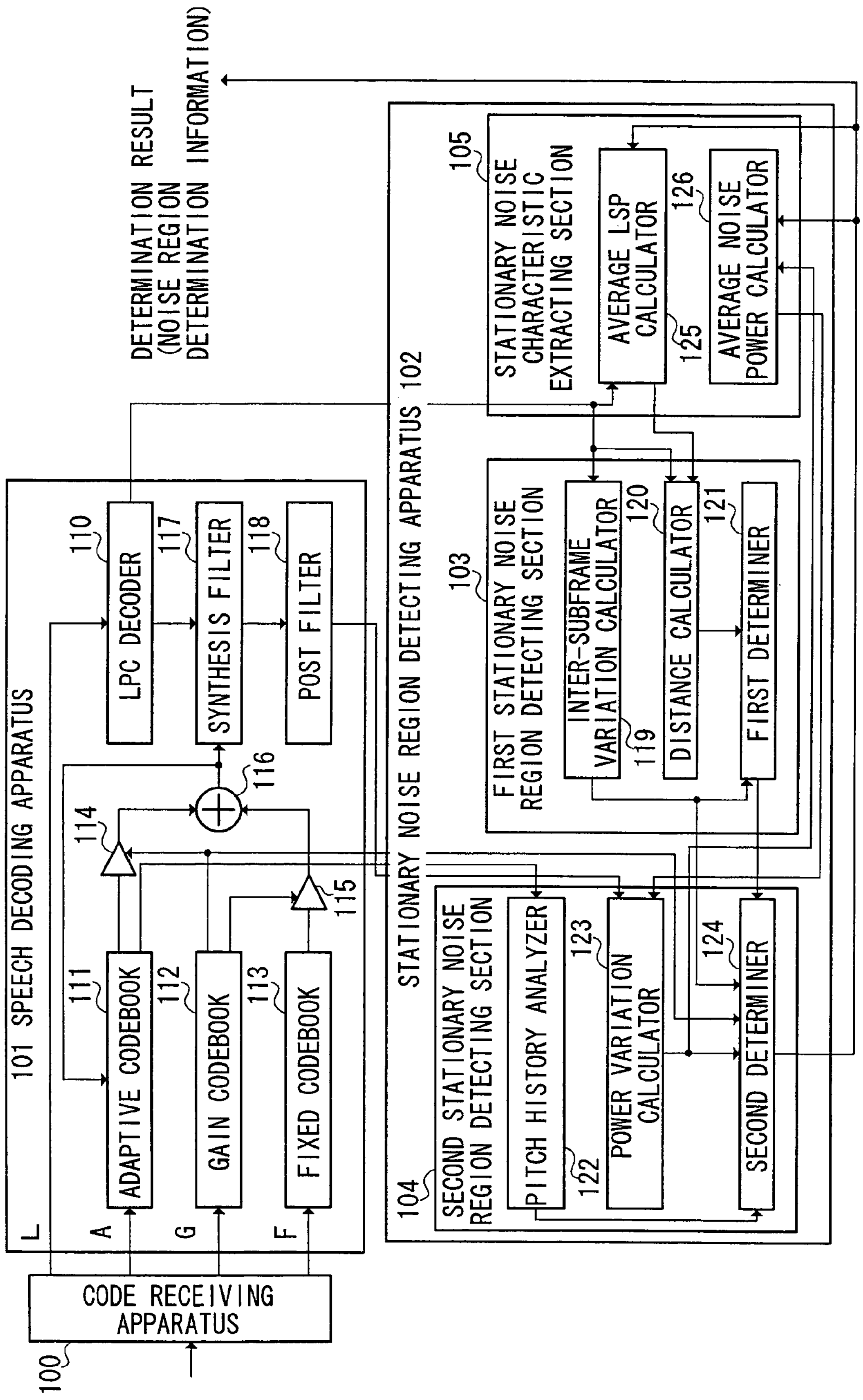
FIG. 1 is a diagram showing a configuration of a stationary noise period identifying apparatus according to a first embodiment of the present invention.

FIG. 1 illustrates a configuration of a stationary noise period identifying apparatus according to the first embodiment of the present invention.

Given a digital signal input, an encoder (not shown) first performs an analysis and quantization of Linear Prediction Coefficients (LPC), pitch search, fixed codebook search and gain codebook search, and then transmits the LPC code (L), pitch period (A), fixed codebook index (F) and gain codebook index (G).

A code receiving apparatus 100 receives the encoded signal transmitted from the encoder, and separates the code L representing the LPC, a code A representing an adaptive code vector, code G representing gain information and code F representing a fixed code vector, from the received encoded signal. The code L, code A, code G and code F are output to a speech decoding apparatus 101. TO be more specific, the code L is output to an LPC decoder 110, code A is output to an adaptive codebook 111, code G is output to a gain codebook 112, and code F is output to a fixed codebook 113.

Speech decoding apparatus 101 will be described first.

LPC decoder 110 decodes the LPC from the code L and outputs the decoded LPC to a synthesis filter 117. LPC decoder 110 converts the decoded LPCs into an Line Spectrum Pair (LSP) parameter for better interpolation property, and outputs this LSPs to an inter-subframe variation calculator 119, distance calculator 120 and average LSP calculator 125, which are provided in a stationary noise period detecting apparatus 102.

In general, the code L is an encoded version of the LSPs, and, in this case, LPC decoder 110 decodes the LSPs and then converts the decoded LSPs to LPCs. The LSP parameter is an example of spectrum envelope parameters representing the spectrum envelope component of a speech signal. Other examples include the PARCOR coefficients and the LPCs.

Adaptive codebook 111 provided in speech decoding apparatus 101 regularly updates excitation signals produced earlier and stores these signals, and produces an adaptive code vector using the adaptive codebook index (i.e. pitch period (pitch lag)) obtained by decoding the code A. The adaptive code vector produced in adaptive codebook 111 is multiplied by an adaptive code gain in an adaptive code gain multiplier 114, and the result is output to an adder 116. The pitch period obtained in adaptive codebook 111 is output to a pitch history analyzer 122 provided in stationary noise period detecting apparatus 102.

Gain codebook 112 stores a predetermined number of sets of adaptive codebook gains and fixed codebook gains (i.e. gain vectors), outputs the adaptive codebook gain component (i.e. adaptive code gain) of the gain vector, specified by the gain codebook index obtained by decoding the code G, to adaptive code gain multiplier 114 and a second determiner 124, and outputs the fixed codebook gain component (i.e. fixed code gain) of the gain vector, to a fixed code gain multiplier 115.

Fixed codebook 113 stores a predetermined number of fixed code vectors of different shapes, and outputs a fixed code vector specified by a fixed codebook index obtained by decoding the code F to fixed code gain multiplier 115. Fixed code gain multiplier 115 multiplies the fixed code vector by the fixed code gain and outputs the result to adder 116.

Adder 116 adds the adaptive code vector from adaptive code gain multiplier 114 and the fixed code vector from fixed code gain multiplier 115 to produce an excitation signal for a synthesis filter 117, and outputs the excitation signal to synthesis filter 117 and adaptive codebook 111.

Synthesis filter 117 configures an LPC synthesis filter using the LPCs from LPC decoder 110. Synthesis filter 117 performs filtering process of the excitation signal from adder 116, synthesizes the decoded speech signal and outputs the synthesized decoded speech signal to a post-filter 118.

Post-filter 118 performs the processing (e.g. formant enhancement and pitch enhancement) for improving the subjective quality of the signal synthesized by synthesis filter 117, and outputs the result as a post-filter output signal of speech decoding apparatus 101, to a power variation calculator 123 provided in stationary noise period detecting apparatus 102.

The above-described decoding by speech decoding apparatus 101 is carried out for every processing unit of a predetermined period (that is, for every frame of a few tens of milliseconds) or for every shorter processing unit (i.e. subframe). Cases will be described below where decoding is carried out on a per subframe basis.

Stationary noise period detecting apparatus 102 will be described below. A first stationary noise period detector 103 provided in stationary noise period detecting apparatus 102 will be explained first. First stationary noise period detector 103 and second stationary noise period detector 104 perform mode selection and determine whether the target subframe represents a stationary noise period or a speech signal period.

The LSPs from LPC decoder 110 are output to first stationary noise period detector 103 and stationary noise property extractor 105 provided in stationary noise period detecting apparatus 102. The LSPs input to first stationary noise period detector 103 are input to an inter-subframe variation calculator 119 and a distance calculator 120.

Inter-subframe variation calculator 119 calculates how much the LSPs have changed from the immediately preceding subframe. Specifically, based on the LSPs from LPC decoder 110, inter-subframe variation calculator 119 calculates the difference between the LSPs of the current subframe and the LSPs of the preceding subframe for each order, and outputs the sum of the squares of the differences, as the amount of inter-subframe variation, to a first determiner 121 and a second determiner 124.

In addition, it is preferable to use a smoothed version of the LSPs for calculating the amount of the variation so that the influence of quantization error fluctuations is minimized. Excessive smoothing is to be avoided, since it may result in poor responsiveness to variations between subframes. For example, to smooth the LSP as shown in equation 1, it is preferable to set the value of k at about 0.7.

$$\text{Smoothed } LSPs \text{ [current subframe]} = k \times LSPs + (1-k) \times \text{smoothed } LSPs \text{ [preceding subframe]} \qquad \text{(Equation 1)}$$

Distance calculator 120 calculates the distance between the average LSPs in earlier stationary noise periods from an average LSP calculator 125 and the LSPs of the current subframe from LPC decoder 110, and outputs the calculation result to first determiner 121. For the distance between the average LSPs and the LSPs of the current subframe, for example, distance calculator 120 calculates the difference between the average LSPs from average LSP calculator 125 and the LSPs of the current subframe from LPC decoder 110, for each order, and outputs the sum of the squares of the differences. Distance calculator 120 may output the sum of the square of the LSP differences calculated for each order, and may output, in addition, the LSP differences themselves. In addition to these values, distance calculator 120 may output the maximum value of the LSP differences. Thus, by outputting various measures of the distance to first determiner 121, it is possible to improve the reliability of determination in first determiner 121.

Based on the information from inter-subframe variation calculator 119 and distance calculator 120, first determiner 121 evaluates the degree of LSP variation between subframes and the similarity (i.e. distance) between the LSPs of the current subframe and the average LSPs of the stationary noise period. More specifically, these are determined using thresholds. If the LSP variation between subframes is small and the LSPs of the current subframe are similar to the average LSPs of the stationary noise period (that is, if the distance is small), the current subframe is determined to represent a stationary noise period, and this determination result (i.e. first determination result) is output to second determiner 124.

In this way, first determiner 121 tentatively determines whether the current subframe represents a stationary noise period, by first evaluating the stationary properties of the current subframe based on the amount of LSP variation between the preceding sub frame and the current subframe, and by further evaluating the noise properties of the current subframe based on the distance between the average LSPs and the LSPs of the current subframe.

However, evaluation based solely on the LSPs may result in, for example, misidentification of a periodic stationary signal such as a stationary vowel or sine wave, as a noise signal. Therefore, second determiner 124 provided in second stationary noise period detector 104 described below analyzes the periodicity of the current subframe, and, based on the analysis result, determines whether the current subframe represents a stationary noise period. That is to say, since a signal having a strong periodicity is likely to be a stationary vowel or the like (not noise), second determiner 124 determines that the signal does not represent a stationary noise period.

Second stationary noise period detector 104 will be described below.

A pitch history analyzer 122 analyzes the fluctuations of pitch periods, which is input from the adaptive codebook, between subframes. Specifically, pitch history analyzer 122 temporarily stores the pitch periods of a predetermined number of subframes (e.g. ten subframes) from adaptive codebook 111, and groups these pitch periods (i.e. the pitch periods of the last ten subframes including the current subframe) by the method shown in FIG. 2.

Figure 2:
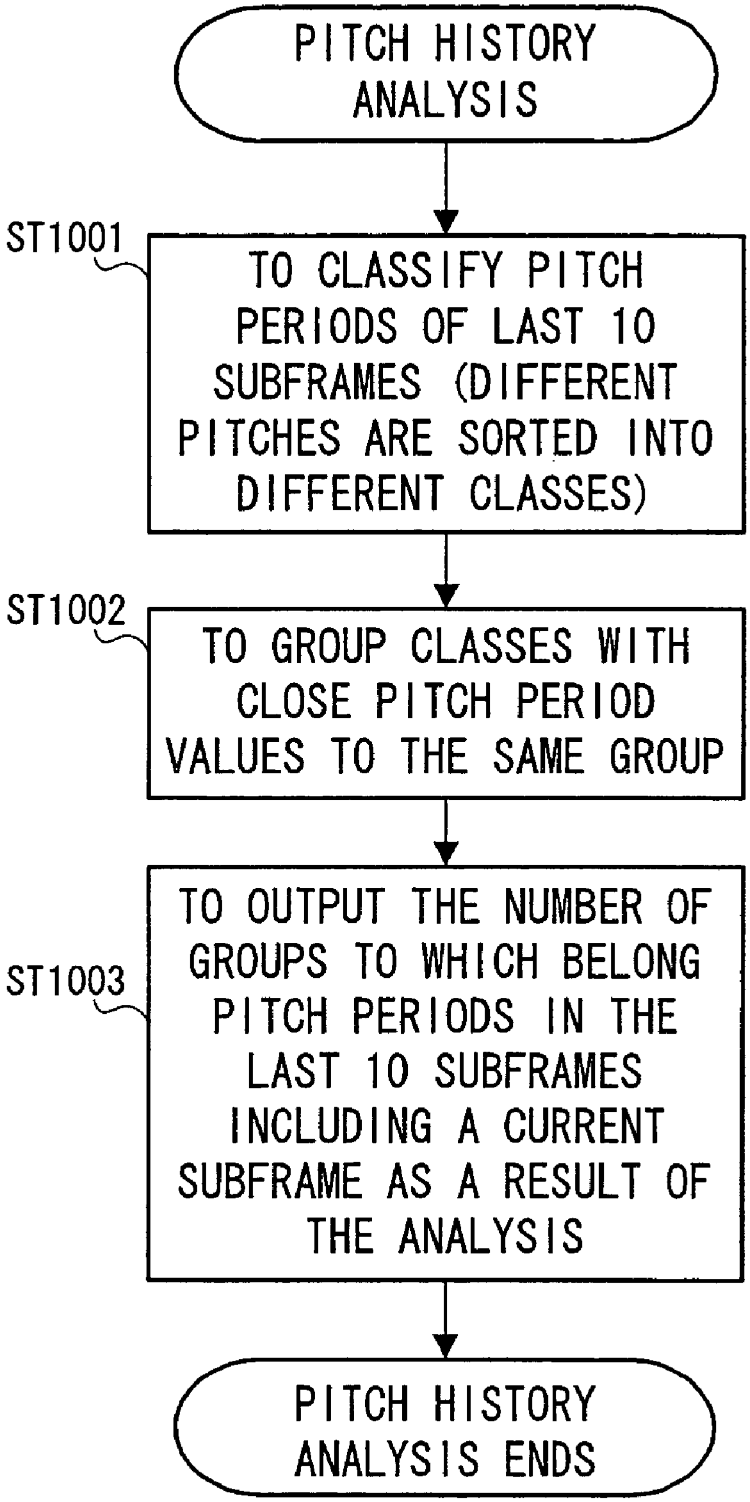
FIG. 2 is a flowchart showing procedures of grouping of pitch history.

The grouping will be described using as an example a case of grouping the pitch periods of the last ten subframes including the current subframe. FIG. 2 is a flow chart showing the steps of the grouping. First, in ST1001, the pitch periods are classified. More specifically, pitch periods with the same value are sorted into the same class. That is, pitch periods having exactly the same value are sorted into the same class, while pitch periods having even slightly different values are sorted into different classes.

Next, in ST1002, classes having close pitch period values are grouped into one group. For example, pitch periods between which the difference is within 1, are sorted into one group. In this grouping, if there are five classes where the difference between pitch periods is within 1 (e.g. there are classes for the pitch periods of 30, 31, 32, 33 and 34), these five classes may be grouped as one group.

In ST1003, as a result of the grouping, an analysis result showing the number of groups into which the pitch periods of the last ten subframes including the current subframe are classified, is output. The less the number of groups shown in the result of analysis (minimum one), the more likely the decoded speech signal is periodic. On the other hand, the greater the number of groups, the less likely the decoded speech signal is periodic. Accordingly, if the decoded speech signal is stationary, it is possible to use the result of this analysis as a parameter representing periodic stationary signal properties (i.e. the periodicity of stationary signal).

A power variation calculator 123 receives, as input, the post-filter output signal from post filter 118 and average power information of the stationary noise period from an average noise power calculator 126. Power variation calculator 123 calculates the power of the output signal of post filter 118, and calculates the ratio of the power of the post-filter output signal to the average power of the signal in the stationary noise period. This power ratio is output to second determiner 124 and average noise power calculator 126. Power information of the post-filter output signal is also output to average noise power calculator 126. If the power (i.e. current signal power) of the output signal of post filter 118 is greater than the average power of the signal in the stationary noise period, there is a possibility that the current subframe contains a speech period. The average power of the signal in the stationary noise period and the power of the output signal of post filter 118 are used as parameters to detect, for example, the onset of speech that cannot be identified using other parameters. Instead of calculating and using the ratio of the power of the post-filter output signal to the average power of the signal in the stationary noise period, power variation calculator 123 may calculate and use the difference between these powers as a parameter.

As described above, the output of pitch history analyzer 122 (i.e. information showing the number of groups into which earlier pitch periods are classified) and the adaptive code gain from gain codebook 112 are input to second determiner 124. Using these information, second determiner 124 evaluates the periodicity of the post-filter output signal. In addition, the following information are input to second determiner 124; the first determination result from first determiner 121, the ratio of the power of the signal in the current subframe to the average power of the signal in the stationary noise period from power variation calculator 123, and the amount of inter-subframe LSP variation from inter-subframe variation calculator 119. Based on these information and the determination result of the periodicity, second determiner 124 determines whether the current subframe represents a stationary noise period, and outputs this determination result to subsequent processing apparatus. The determination result is also output to average LSP calculator 125 and average noise power calculator 126. In addition, any of three apparatuses; code receiving apparatus 100, speech decoding apparatus 101 and stationary noise period detecting apparatus 102, may have a decoder that decodes information, which is contained in a received code, showing the presence or absence of a voiced stationary signal and outputs the decode information to second determiner 124.

Stationary noise property extractor 105 will be described below.

Average LSP calculator 125 receives, as input, the determination result from second determiner 124 and the LSPs of the current subframe from speech decoding apparatus 101 (more specifically, from LPC decoder 110). If the determination result provided by second determiner 124 indicates a stationary noise period, average LSP calculator 125 recalculates the average LSPs in the stationary noise period using the LSPs of the current subframe. The average LSPs are recalculated using, for example, an autoregressive model smoothing algorithm. The recalculated average LSPs are output to distance calculator 120.

Average noise power calculator 126 receives, as input, the determination result from second determiner 124, and the power of the post-filter output signal and the ratio of the power of the post-filter output signal to the average power of the signal in the stationary noise period, from power variation calculator 123. If the determination result from second determiner 124 shows a stationary noise period, or if the determination result does not indicate a stationary noise period yet nevertheless the power ratio is less than a predetermined threshold (that is, if the power of the post-filter output signal of the current subframe is less than the average power of the signal in the stationary noise period), average noise power calculator 126 recalculates the average power (i.e. average noise power) of the signal in the stationary noise period using the post-filter output signal power. The average noise power is recalculated using, for example, an autoregressive model smoothing algorithm. In this case, by adding control of mod erating the smoothing if the power ratio decreases (so as to make the post-filter output signal power of the current subframe emerge), it is possible to decrease the level of the average noise power promptly if the background noise level decreases rapidly in a speech period. The recalculated average noise power is output to power variation calculator 123.

In the above, the LPCs, LSPs and average LSPs are parameters representing the spectrum envelope component of a speech signal, while the adaptive code vector, noise code vector, adaptive code gain and noise code gain are parameters representing the residual component of the speech signal. Parameters representing the spectrum envelope component and parameters representing the residual component are not limited to the herein-contained examples.

Figure 3:
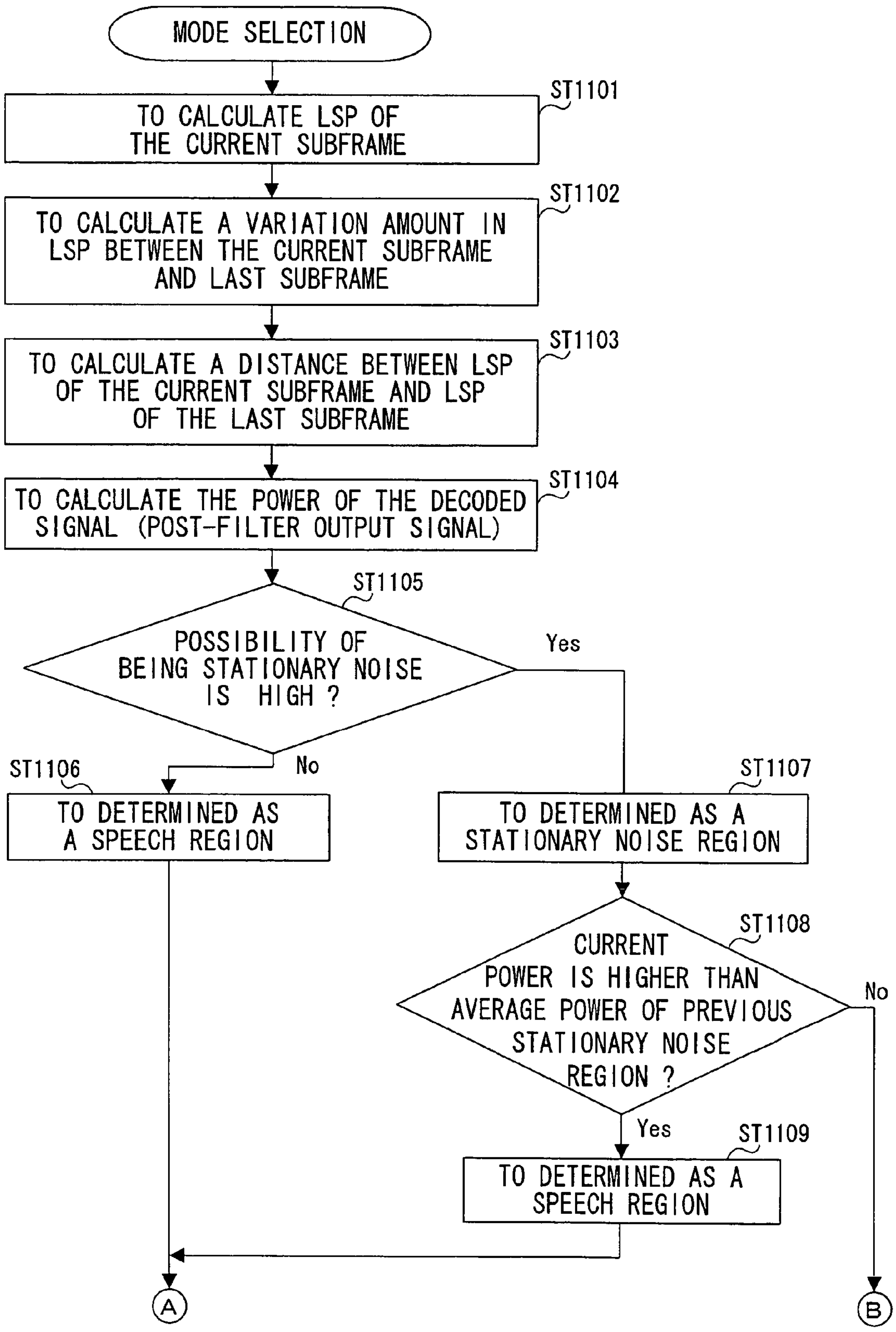
FIG. 3 is a diagram showing part of the flow of mode selection.
Figure 4:
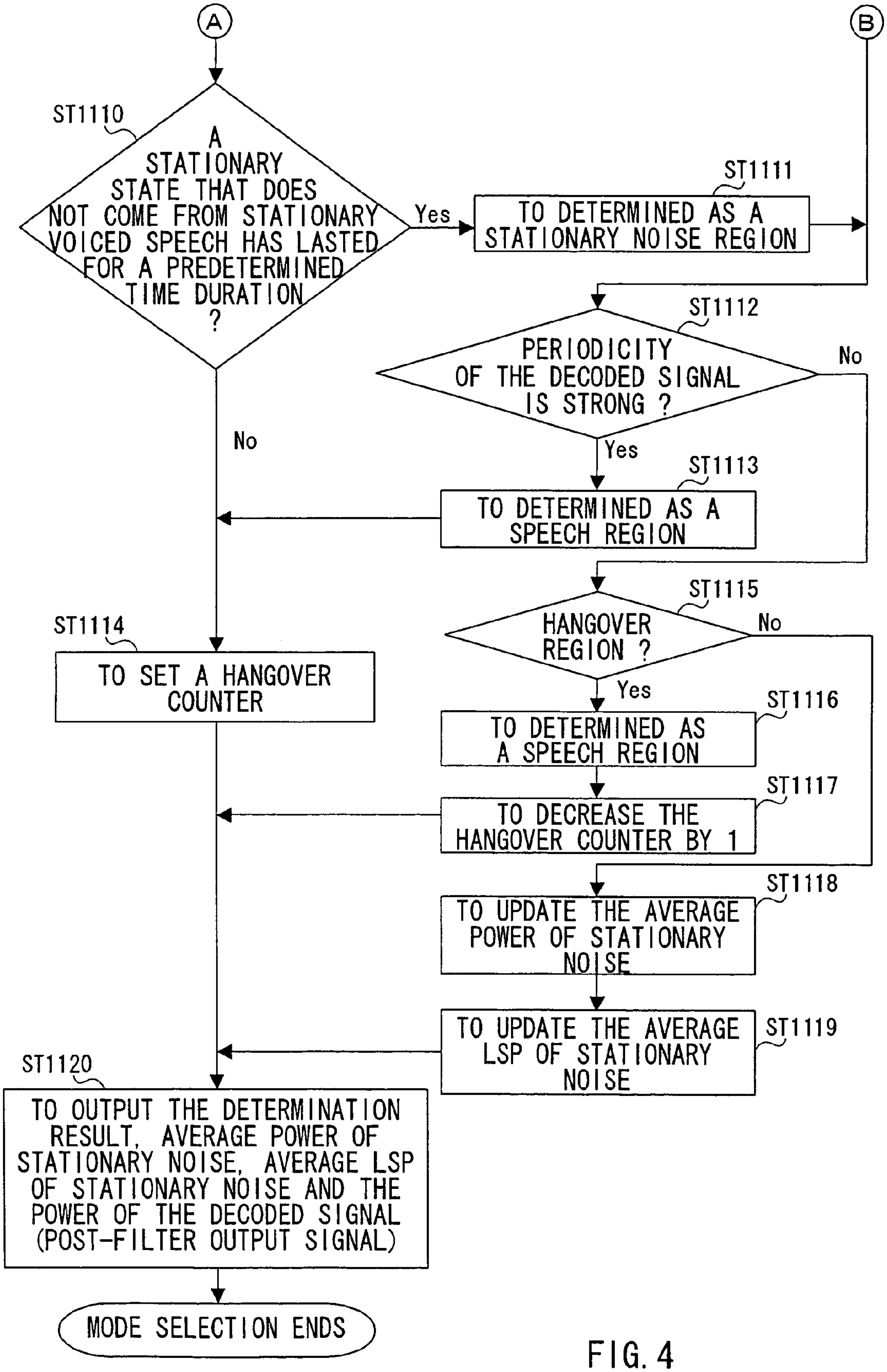
FIG. 4 is another diagram showing part of the flow of mode selection.

The steps of processing in first determiner 121, second determiner 124 and stationary noise property extractor 105 are described below with reference to FIGS. 3 and 4. In FIGS. 3 and 4, ST1101 to ST1107 are principally performed in first stationary noise period detector 103, ST1108 to ST1117 are principally performed in second stationary noise period detector 104, and ST1118 to ST1120 are principally performed in stationary noise property extractor 105.

In ST1101, the LSPs of the current subframe are calculated and smoothed according to equation 1 given earlier. In ST1102, the difference (that is, the amount of variation) between the LSPs of the current subframe and the LSPs of the immediately preceding subframe is calculated. ST1101 and ST1102 are performed in inter-subframe variation calculator 119 described earlier.

An example of the method of calculating the amount of inter-subframe LSP variation in variation calculator 119 is shown in equation 1', equation 2 and equation 3. Equation 1' smoothes the LSPs of the current subframe, equation 2 provides the difference of the smoothed LSPs between subframes in a square sum, and equation 3 further smoothes the sum of the squares of the LSP differences between subframes.

$$L'i(t)=0.7\times Li(t)+0.3\times L'i(t-1) \quad \text{(Equation 1')}$$

$$DL(t)=\sum_{i=1}^{p}\{[L'i(t)-L'i(t-1)]^2\} \quad \text{(Equation 2)}$$

$$DL'(t)=0.1\times DL(t)+0.9\times DL'(t-1) \quad \text{(Equation 3)}$$

In these equations, L'i(t) represents the smoothed LSP parameter of the i-th order in the t-th subframe, Li(t) represents the LSP parameter of the i-th order in the t-th subframe, DL(t) represents the amount of LSP variation in the t-th subframe (i.e. the sum of the squares of LSP differences between subframes), DL'(t) represents a smoothed version of the amount of LSP variation in the t-th subframe (i.e. a smoothed version of the sum of the squares of LSP differences between subframes), and p represents the LSP (LPC) analysis order. In this example, DL'(t) is calculated in inter-subframe variation calculator 119 using equation 11, equation 2 and equation 3, and then used in mode determination as the amount of inter-subframe LSP variation.

In ST1103, distance calculator 120 calculates the distance between the LSPs of the current subframe and the average LSPs in earlier noise periods. Equation 4 and equation 5 show an example of the distance calculation in distance calculator 120.

$$D(t)=\sum_{i=1}^{p}\{[Li(t)-LNi]^2\} \quad \text{(Equation4)}$$

$$DX(t)=\text{Max}\{[Li(t)-LNi]^2\}\ i=1,,,p \quad \text{(Equation 5)}$$

Equation 4 defines the distance between the average LSPs in earlier noise periods and the LSPs in the current subframe by the sum of the squares of the differences in all orders. Equation 5 defines the distance by the square of the difference in one order whose difference is the largest among all orders. LNi represents the average LSPs in earlier noise periods and updated on a per subframe basis in a noise period, using, for example, equation 6.

$$LNi=0.95\times LNi+0.05\times Li(t) \quad \text{(Equation 6)}$$

In this example, D(t) and DX(t) are determined in distance calculator 120 using equation 4, equation 5 and equation 6, and then used in mode determination as information representing the distance from the LSPs in the stationary noise period.

In ST1104, power variation calculator 123 calculates the power of the post-filter output signal (i.e. the output signal from post filter 118). This power calculation is performed in power variation calculator 123 described earlier, using equation 7, for example.

$$P=\sqrt{\left\{\sum_{i=0}^{N}[S(i)\times S(i)]\right\}} \quad \text{(Equation 7)}$$

In equation 7, S(i) is the post-filter output signal, and N is the length of the subframe. The power calculation in ST1104 is performed in power variation calculator 123 provided in second stationary noise period detector 104 as shown in FIG. 1. This power calculation needs to be performed before ST1108 but is not limited to ST1104.

In ST1105, the stationary noise properties of the decoded signal are evaluated. To be more specific, it is determined whether both of the amount of LSP variation calculated in ST 1102 and the distance calculated in ST 1103 are small. Thresholds are set for the amount of LSP variation calculated in ST1102 and the distance calculated in ST1103. If the amount of LSP variation calculated in ST1102 is below the threshold and the distance calculated in ST1103 is below the threshold, the stationary noise properties are high and the flow proceeds to ST1107. For example, with respect to DL', D and DX described earlier, if the LSPs are normalized in the range between 0.0 and 1.0, using the following thresholds improves the reliability of the above determination.

Threshold for DL: 0.0004

Threshold for D: 0.003+D∝

Threshold for DX: 0.0015

D' is the average value of D in the noise period, and calculated as shown in equation 8 in the noise period.

$$D'=0.05\times D(t)+0.95\times D' \quad \text{(Equation 8)}$$

LNi is the average LSPs in earlier noise period yet has an reliable value only when a sufficient number of noise periods are available for sampling (e.g. 20 subframes), D and DX are not used in the evaluation of stationary noise properties in ST1005 if the previous noise period is less than a predetermined time length (e.g. 20 subframes).

In ST1107, the current subframe is determined as a stationary noise period, and the flow proceeds to ST1108. Meanwhile, if either the amount of LSP variation calculated in ST1102 or the LSP distance calculated in ST1103 is greater than the threshold, the current subframe is determined to have low stationary properties, and the flow shifts to ST1106. In ST1106, it is determined that the subframe does not represent a stationary noise period (in other words, the subframe is determined to represent a speech period), and the flow proceeds to ST1110.

In ST1108, it is determined whether the power of the current subframe is greater than the average power of earlier stationary noise periods. Specifically, a threshold for the output of power variation calculator 123 (the ratio of the power of the post-filter output signal to the average power of the stationary noise period) is set, and, if the ratio of the power of the post-filter output signal to the average power of the stationary noise period is greater than the threshold, the flow proceeds to ST1109. In ST1109, the current subframe is determined to represent a speech period.

For example, using 2.0 for this threshold improves the reliability of the above determination. If the power P of the post-filter output signal calculated using equation 7 is greater than twice the average power PN' of the stationary noise period, the flow proceeds to ST1109. The average power PN' is updated on a per subframe basis in the stationary noise period using equation 9, for example.

$$PN'=0.9\times PN'+0.1\times P \quad \text{(Equation 9)}$$

If the amount of power variation is less than the threshold, the flow proceeds to ST1112. In this case, the determination result in ST1107 is maintained and the current subframe is determined to represent a stationary noise period.

Next, in ST1110, it is checked how long the stationary state has lasted and whether the stationary state is a stationary voiced speech state. Then, if the current subframe does not represent a stationary voiced speech state and the stationary state has lasted a predetermined time, the flow proceeds to ST1111, and, in ST1111, the current subframe is determined to represent a stationary noise period.

Specifically, whether the current subframe is in a stationary state is determined using the output from inter-subframe variation calculator 119 (i.e. the amount of inter-subframe variation). In other words, if the inter-subframe variation amount from ST1102 is small (i.e. less than a predetermined threshold), the current subframe is determined to represent a stationary state. The same threshold as in ST1105 may be used. Thus, if the current subframe is determined to represent a stationary noise state, it is checked how long this state has lasted.

Whether the current subframe represents a stationary voiced speech state is determined based on information showing whether the current subframe represents a stationary voiced speech, provided from stationary noise period detecting apparatus 102. For example, if transmitted code information contains the above information as mode information, whether the current subframe represents a stationary voiced speech state is determined using the decoded mode information. Otherwise, a section provided in stationary noise period detecting apparatus 102 to evaluate voiced stationary properties, may output the above information, and, using this information, determines whether the current subframe represents a stationary voiced speech state.

If, as a result of the check, the stationary state has lasted a predetermined time (e.g. 20 subframes or longer) and the current subframe does not represent a stationary voiced speech state, the current subframe is determined to represent a stationary noise period in ST1111, even if in ST1108 the power variation is determined to be large, and then the flow proceeds to ST1112. On the other hand, if ST1110 yields a negative result (that is, if the current subframe represents a voiced stationary period or if a stationary state has not lasted a predetermined time), it is kept to determine that the current subframe represents a speech period, and the flow proceeds to ST1114.

Next, if the current subframe is determined to represent a stationary noise period up till this point, whether the periodicity of the decoded signal is high is determined in ST1112. To be more specific, based on the adaptive code gain from speech decoding apparatus 101 (that is, from gain codebook 112) and the pitch history analysis result from pitch history analyzer 122, second determiner 124 evaluates the periodicity of the decoded signal in the current subframe. In this case, the adaptive code gain is preferably subjected to processing of autoregressive model smoothing so as to smooth the variations between subframes.

In this periodicity evaluation, for example, a threshold for the adaptive code gain after smoothing processing (i.e. the smoothed adaptive code gain) is set, and, if the smoothed adaptive code gain is greater than the predetermined threshold, the periodicity is determined to be high, and the flow proceeds to ST1113. In ST1113, the current subframe is determined to represent a speech period.

Further, if the number of groups into which the pitch periods of earlier subframes are classified is small in the pitch history analysis result, periodic signals are likely to be continuing. Therefore the periodicity is evaluated based on this number of groups. For example, if the pitch periods of the past ten subframes are classified into three or fewer groups, it is likely that periodic signals are continuing in the current period, and the flow shifts to ST1113, and, in ST 1113, the current subframe is determined to represent a speech period, not a stationary noise period.

If ST1112 yields a negative result (that is, if the smoothed adaptive code gain is less than the predetermined threshold and the number of groups into which the pitch periods of earlier subframes are classified is small in the pitch history analysis result), it is kept to determine that the current subframe represents a stationary noise period, and the flow proceeds to ST1115.

If a determination result showing a speech period is provided up till this point, the flow proceeds to ST1114, and a predetermined number of hangover subframes (e.g. 10) is set on the hangover counter. The number of hangover frames is set on the hangover counter for the initial value, which is then decremented by 1 every time a stationary noise period is identified through ST1101 to ST1113. If the hangover counter shows "0", the current subframe is definitively determined to represent a stationary noise period.

If a determination result showing a stationary noise period is provided up till point, the flow shifts to ST1115, and it is checked whether the hangover counter is within a hangover range (i.e. the range between 1 and the number of hangover frames). In other words, whether the hangover counter shows "0" is checked. If the hangover counter is within the above-noted hangover range, the flow proceeds to ST1116. In ST1116, the current subframe is determined to represent a speech period, and, following this, in ST1117, the hangover counter is decremented by 1. If the counter is not in the hangover range (that is, when the counter shows "0"), the result is kept to determine that the current subframe represents a stationary noise period, and the flow proceeds to ST1118.

If the determination result shows a stationary noise period, average LSP calculator 125 updates the average LSPs in the stationary noise period in ST1118. This updating is performed using, for example, equation 6, if the determination result shows a stationary noise period. Otherwise, the previous value is maintained without updating. In addition, if the time determined earlier to represent a stationary noise period is short, the smoothing coefficient, 0.95, in equation 6 may be made less.

In ST1119, average noise power calculator 126 updates the average noise power. The updating is performed, for example, using equation 9, if the determination result shows a stationary noise period. Otherwise, the previous value is maintained without updating. However, even if the determination result does not show a stationary noise period, if the power of the current post-filter output signal is below the average noise power, the average noise power is updated using equation 9, in which the smoothing coefficient 0.9 is replaced with a smaller value, so as to decrease the average noise power. By this means, it is possible to accommodate cases where the background noise level suddenly decreases during a speech period.

Finally, in ST1120, second determiner 124 outputs the determination result, average LSP calculator 125 outputs the updated average LSPs, and average noise power calculator 126 outputs the updated average noise power.

As described above, according to this embodiment, if it is determined that a subframe represents a stationary noise period according to the evaluation of stationary properties using the LSPs, the degree of the periodicity of the subframe is evaluated using the adaptive code gain and the pitch period, and, based on this degree of periodicity, it is checked again whether the subframe represents a stationary noise period. Accordingly, it is possible to correctly identify signals that are stationary yet not noisy such as sine waves and stationary vowels.

Second Embodiment

Figure 5:
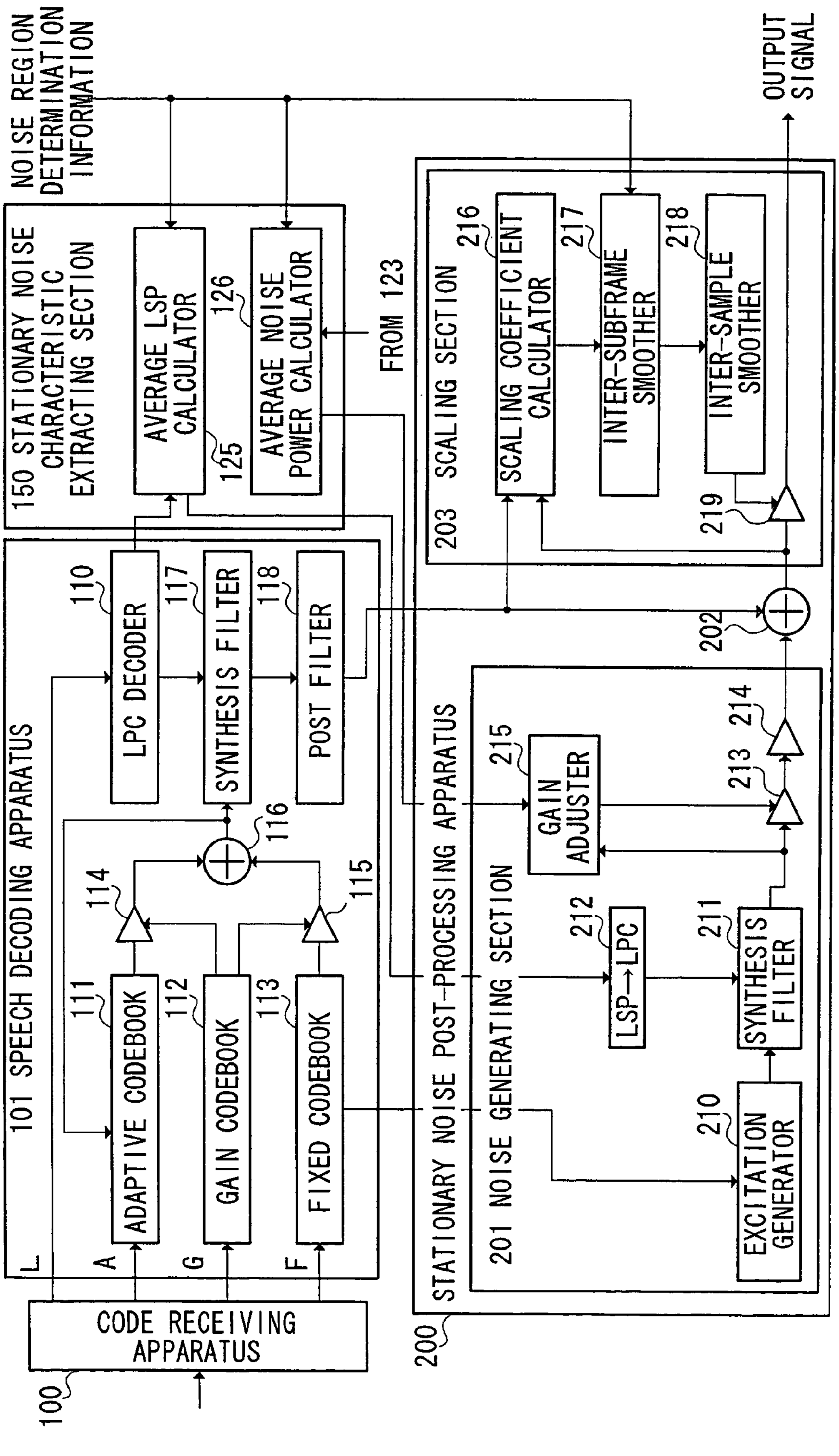
FIG. 5 is a diagram showing a configuration of a stationary noise post-processing apparatus according to a second embodiment of the present invention.

FIG. 5 illustrates the configuration of a stationary noise post-processing apparatus according to the second embodiment of the present invention. In FIG. 5, the same parts as in FIG. 1 are assigned the same reference numerals as in FIG. 1, and specific descriptions thereof are omitted.

A stationary noise post-processing apparatus 200 is comprised of a noise generator 201, adder 202 and scaling section 203. In stationary noise post-processing apparatus 200, adder 202 adds a pseudo stationary noise signal generated in noise generator 201 and the post-filter output signal from speech decoding apparatus 101, scaling section 203 adjusts the power of the post-filter output signal after the addition by performing scaling processing, and the resulting post-filter output signal becomes outputs of stationary noise post-processing apparatus 200.

Noise generator 201 is comprised of an excitation generator 210, synthesis filter 211, LSP/LPC converter 212, multiplier 213, multiplier 214 and gain adjuster 215. Scaling section 203 is comprised of a scaling coefficient calculator 216, inter-subframe smoother 217, inter-sample smoother 218 and multiplier 219.

The operation of stationary noise post-processing apparatus 200 of the above-mentioned configuration will be described below.

Excitation generator 210 selects a fixed code vector at random from fixed codebook 113 provided in speech decoding apparatus 101, and, based on the selected fixed code vector, generates a noise excitation signal and outputs this signal to synthesis filter 211. The noise excitation signal needs not to be generated based on a fixed code vector selected from fixed codebook 113 provided in speech decoding apparatus 101, and an optimal method may be chosen for system by system in view of the computational complexity, memory requirements, the properties of the noise signal to be generated, etc. Generally, using a fixed code vector selected from fixed codebook 113 provided in speech decoding apparatus 101 proves effective. LSP/LPC converter 212 converts the average LSPs from average LSP calculator 125 into an LPCs and outputs the LPCs to synthesis filter 211.

Synthesis filter 211 configures an LPC synthesis filter using the LPCs from LSP/LPC converter 212. Synthesis filter 211 performs filtering processing using the noise excitation signal from excitation generator 210 and synthesizes the noise signal, and outputs the synthesized noise signal to multiplier 213 and gain adjuster 215.

Gain adjuster 215 calculates the gain adjustment coefficient for adjusting the power of the output signal of synthesis filter 211 to the average noise power from average noise power calculator 126. The gain adjustment coefficient is subjected to smoothing processing for realizing a smooth continuity between subframes and furthermore subjected to smoothing processing on a per sample basis for realizing a smooth continuity in each subframe. Finally, the gain adjustment coefficient is output to multiplier 213 for each sample. Specifically, the gain adjustment coefficient is obtained according to equation 10, equation 11 and equation 12.

$$Psn'=0.9\times Psn'+0.1\times Psn \quad \text{(Equation 10)}$$

$$Scl=PN'/Psn' \quad \text{(Equation 11)}$$

$$Scl'=0.85\times Scl'+0.15\times Scl \quad \text{(Equation 12)}$$

In these equations, Psn is the power of the noise signal synthesized by synthesis filter 211 (calculated as shown in equation 7), and Psn' is a version of Psn smoothed between subframes and updated using equation 10. PN' is the power of the stationary noise signal given by equation 9, and Scl is the scaling coefficient in the processing frame. Scl' is the gain adjustment coefficient, employed on a per sample basis, and updated on a per sample basis using equation 12.

Multiplier 213 multiplies the gain adjustment coefficient from gain adjuster 215 with the noise signal from synthesis filter 211. The gain adjustment coefficient may vary for each sample. The multiplication result is output to multiplier 214.

In order to adjust the absolute level of the noise signal to be generated, multiplier 214 multiplies the output signal from multiplier 213 with a predetermined constant (e.g. about 0.5). Multiplier 214 may be incorporated in multiplier 213. The level-adjusted signal (i.e. stationary noise signal) is output to adder 202. In the above-described way, a stationary noise signal maintaining a smooth continuity is generated.

Adder 202 adds the stationary noise signal generated in noise generator 201 and the post-filter output signal from speech decoding apparatus 101 (more specifically, post filter 118), and adder 202 outputs the result to scaling section 203 (more specifically, to scaling coefficient calculator 216 and multiplier 219).

Scaling coefficient calculator 216 calculates both the power of the post-filter output signal from speech decoding apparatus 101 (more specifically, post filter 118) and the power of the post-filter output signal from adder 202 after the addition with the stationary noise signal, and by calculating the ratio between these powers, scaling coefficient calculator 216 calculates a scaling coefficient that minimizes the signal power difference between the decoded signal (to which stationary noise is not added yet) and a scaled signal. And scaling coefficient calculator 216 outputs the calculated coefficient to inter-subframe smoother 217. Specifically, the scaling coefficient "SCALE" is determined as shown in equation 13.

$$SCALE=P/P' \quad \text{(Equation 13)}$$

P is the power of the post-filter output signal, calculated in equation 7, and P' is the power of the sum signal of the post-filter output signal and the stationary noise signal, calculated by the same equation as for P.

Inter-subframe smoother 217 performs inter-subframe smoothing processing of the scaling coefficient between subframes so that the scaling coefficient varies moderately between subframes. This smoothing is not performed (or is performed very weakly) during the speech period, to avoid smoothing the power of the speech signal itself and making the responsivity to power variation poor. Whether the current subframe represents a speech period is determined based on the determination result from second determiner 124 shown in FIG. 1. The smoothed scaling coefficient is output to inter-sample smoother 218. The smoothed scaling coefficient SCALE' is updated by equation 14.

$$SCALE'=0.9\times SCALE'+0.1\times SCALE \quad \text{(Equation 14)}$$

Inter-sample smoother 218 performs the smoothing processing of the scaling coefficient between samples so that the scaling coefficient varies moderately between samples. This smoothing may be performed in autoregressive model smoothing processing. Specifically, the smoothed coefficient "SCALE''" per sample is updated by equation 15.

$$SCALE''=0.85\times SCALE''+0.15\times SCALE' \quad \text{(Equation 15)}$$

In this way, the scaling coefficient is smoothed between samples and made to vary little by littler per sample, so that it is possible to prevent the scaling coefficient from being discontinues across or near frame boundaries. The scaling coefficient is calculated for each sample and output to multiplier 219.

Multiplier 219 multiplies the scaling coefficient from inter-sample smoother 218 with the post-filter output signal from adder 202 to which with a stationary noise signal is added, and outputs the result as a final output signal.

In the above configuration, the average noise power from average noise power calculator 126, the LPCs from LSP/LPC converter 212 and the scaling coefficient from scaling calculator 216 are parameters used in post-processing.

Thus, according to this embodiment, noise is generated in noise generator 201 and added to the decoded signal (i.e. post-filter output signal), and then scaling section 203 performs the scaling of the decoded signal. In this way, the decoded signal with noise is subjected to scaling so that the power of the decoded signal with adding noise is close to the power of the decoded signal without adding noise. Further, the present embodiment utilizes both inter-frame smoothing and inter-sample smoothing, so that stationary noise becomes smoother, thereby improving the subjective quality of stationary noise.

Third Embodiment

Figure 6:
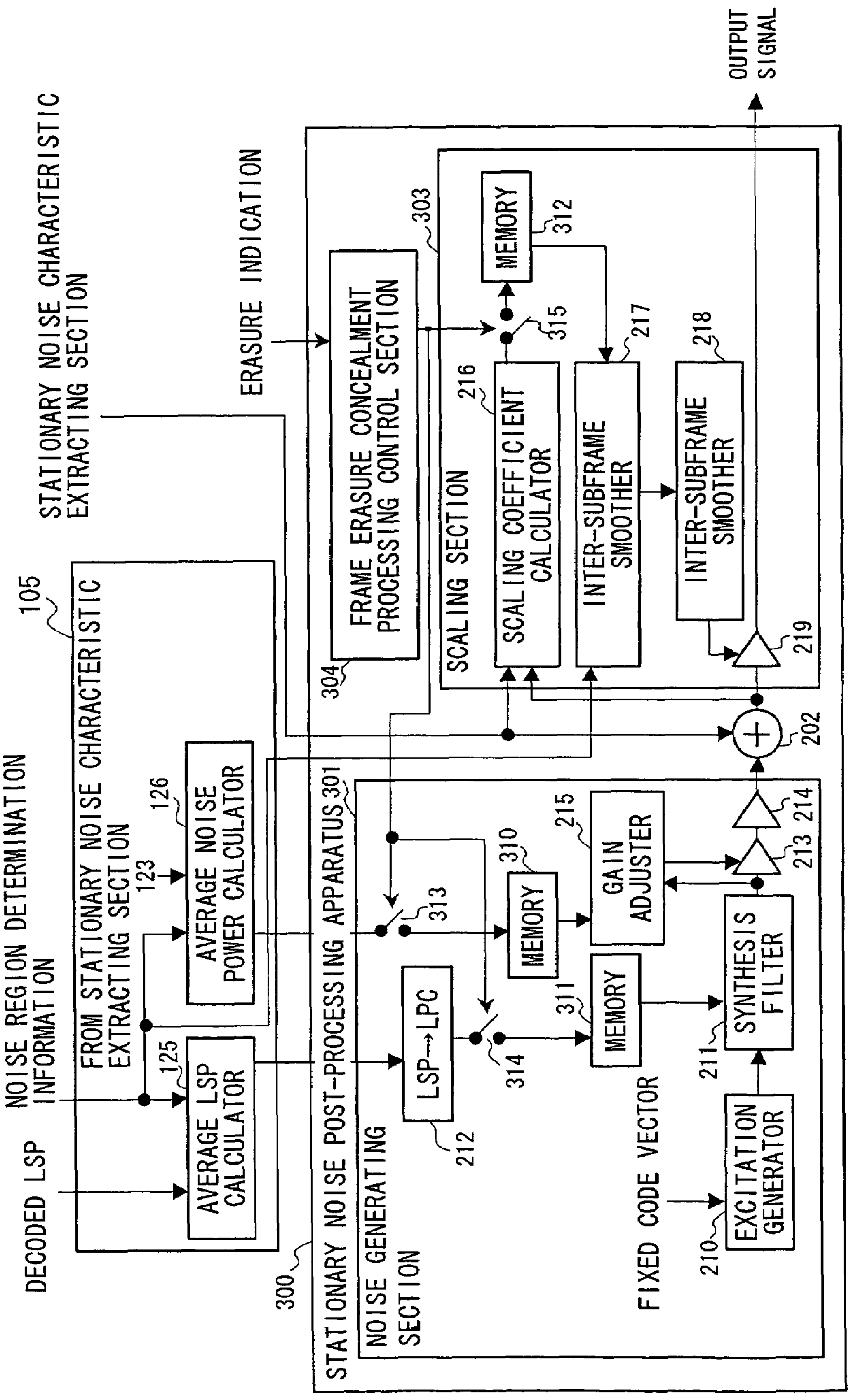
FIG. 6 is a diagram showing a configuration of a stationary noise post-processing apparatus according to a third embodiment of the present invention.

FIG. 6 illustrates a configuration of a stationary noise post-processing apparatus according to the third embodiment of the present invention. In FIG. 6, the same parts as in FIG. 5 are assigned the same reference numerals as in FIG. 5, and specific descriptions thereof are omitted.

In addition to the configuration of stationary noise post-processing apparatus 200 shown in FIG. 2, the apparatus in this embodiment further comprises memories for storing parameters required in noise signal generation and scaling upon frame erasure, a frame erasure concealment processing controller for controlling the memories, and switches used in frame erasure concealment processing.

A stationary noise post-processing apparatus 300 is comprised of a noise generator 301, adder 202, scaling section 303 and frame loss compensation processing controller 304.

Noise generator 301 has a configuration that adds to the configuration of noise generator 201 shown in FIG. 5, memories 310 and 311 for storing parameters required in noise signal generation and scaling upon frame erasure, and switches 313 and 314 that close and open during frame erasure concealment processing. Scaling section 303 is comprised of a memory 312 that stores parameters required in noise signal generation and scaling upon frame erasure and a switch 315 that closes and opens during frame erasure concealment processing.

The operation of stationary noise post-processing apparatus 300 will be described below. First, the operation of noise generator 301 will be explained.

Memory 310 stores the power (i.e. average noise power) of a stationary noise signal from average noise power calculator 126 via a switch 313, and outputs this to gain adjustor 215.

Switch 313 opens and closes in accordance with control signals from a frame loss compensation processing controller 304. Specifically, switch 313 opens when a control signal for performing frame erasure concealment processing is received as input, and stays closed otherwise. When switch 313 opens, memory 310 is in the state of storing the power of the stationary noise signal in the immediately preceding subframe and provides that power to gain adjustor 215 on demand until switch 313 closes again.

Memory 311 stores the LPCs of the stationary noise signal from LSP/LPC converter 212 via switch 314, and outputs this to synthesis filter 211.

Switch 314 opens and closes in accordance with control signals from frame erasure concealment processing controller 304. Specifically, switch 314 opens when a control signal for performing frame erasure concealment processing is received as input, and stays closed otherwise. When switch 314 opens, memory 311 is in the state of storing the LPC of the stationary noise signal in the immediately preceding subframe and provides that LPCs to synthesis filter 211 on demand until switch 314 closes again.

The operation of scaling section 303 will be described below.

Memory 312 stores the scaling coefficient that is calculated in scaling coefficient calculator 216 and output via a switch 315, and Memory 312 outputs this to inter-subframe smoother 217.

Switch 315 opens and closes in accordance with control signals from frame erasure concealment processing controller 304. Specifically, switch 315 opens when a control signal for performing frame erasure concealment processing is received as input, and stays closed otherwise. When switch 315 opens, memory 312 is in the state of storing the scaling coefficient in the preceding subframe and provides that scaling coefficient to inter-subframe smoother 217 on demand until switch 315 closes again.

Frame erasure concealment processing controller 304 receives, as input, a frame erasure indication obtained by error detection etc and outputs a control signal to switches 313 to 315. The control signal is used for performing frame erasure concealment processing during subframes in the lost frame and the next recovered subframes after the lost frame (error-recovered subframe(s)). This frame erasure concealment processing for the error-recovered subframe may be performed for a plurality of subframes (e.g. two subframes). The frame erasure concealment processing refers to the processing of interpolating the parameters and controlling the audio volume using frame information from earlier than the lost frame, so as to prevent the quality of the decoded signal from deteriorating significantly due to loss of part of the subframes. In addition, if significant power change does not occur in the error-recovered subframe following the lost frame, the frame erasure concealment processing in the error-recovered subframe is not necessary.

With a general frame erasure concealment method, the current frame is extrapolated using earlier information. Extrapolated data causes deterioration of subjective quality, and so the signal power is attenuated gradually. However, if frame erasure occurs in a stationary noise period, the deterioration in subjective quality due to break in audio, which is caused by the attenuation of power, is often greater than the deterioration in subjective quality due to the distortion, which is caused by the extrapolation. In particular, in packet communications as typified by internet communications, sometimes frames are lost consecutively, and the deterioration due to break in audio becomes significant. To avoid this, with the stationary noise post-processing apparatus according to the present invention, gain adjustor 215 calculates the gain adjustment coefficient for scaling in accordance with the average noise power from average noise power calculator 126 and multiplies this with the stationary noise signal. Furthermore, scaling coefficient calculator 216 calculates the scaling coefficient such that the power of the stationary noise signal to which the post-filter output signal is added does not change significantly, and outputs the signal multiplied with this scaling coefficient, as the final output signal. By this means, it is possible to suppress the power variation in the final output signal and maintain the signal level of the stationary noise preceding frame erasure, and consequently minimize the deterioration in subjective quality due to breaks in audio.

Fourth Embodiment

Figure 7:
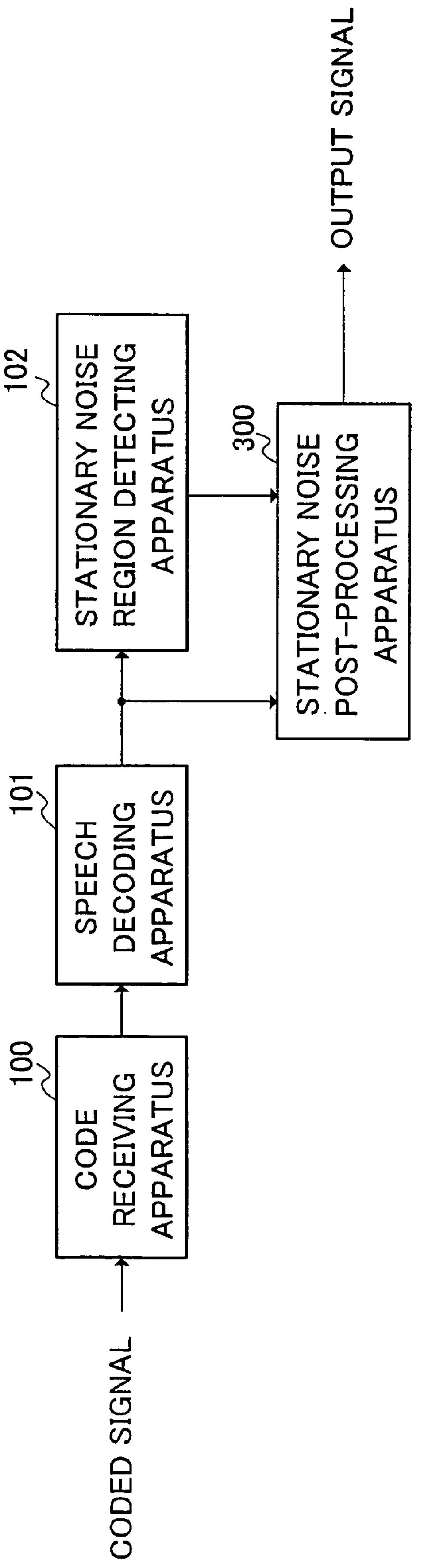
FIG. 7 is a diagram showing a speech decoding processing system according to a fourth embodiment of the present invention.

FIG. 7 is a diagram showing a configuration of a speech decoding processing system according to the fourth embodiment of the present invention. The speech decoding processing system is comprised of code receiving apparatus 100, speech decoding apparatus 101 and stationary noise period detecting apparatus 102, which are explained in the description of the first embodiment, and stationary noise post-processing apparatus 300, which is explained in the description of the third embodiment. In addition, the speech decoding processing system may have stationary noise post-processing apparatus 200 explained in the description of the second embodiment, instead of stationary noise post-processing apparatus 300.

The operation of the speech decoding processing system will be described. Descriptions of the components the system have been provided in the first to third embodiments with reference to FIG. 1, FIG. 5 and FIG. 6, and, in FIG. 7. And therefore the same parts as in FIG. 1, FIG. 5 and FIG. 6 are assigned the same reference numerals as in FIG. 1, FIG. 5 and FIG. 6, respectively, to omit their specific descriptions.

Code receiving apparatus 100 receives a coded signal via the channel, separates various parameters from the signal and outputs these parameters to speech decoding apparatus 101. Speech decoding apparatus 101 decodes a speech signal from the parameters, and outputs a post-filter output signal and other necessary parameters, which are obtained during the decoding processing, to stationary noise period detecting apparatus 102 and stationary noise post-processing apparatus 300. Stationary noise period detecting apparatus 102 determines whether the current subframe represents a stationary noise period using the information from speech decoding apparatus 101, and outputs the determination result and other necessary parameters, which are obtained through the determination processing, to stationary noise post-processing apparatus 300.

In response to the post-filter output signal from speech decoding apparatus 101, stationary noise post-processing apparatus 300 performs the processing of generating a stationary noise signal using various parameter information from speech decoding apparatus 101 and the determination result and other parameter information from stationary noise period detecting apparatus 102, and performs superimposing this stationary noise signal over the post-filter output signal, and outputs the result as the final post-filter output signal.

Figure 8:
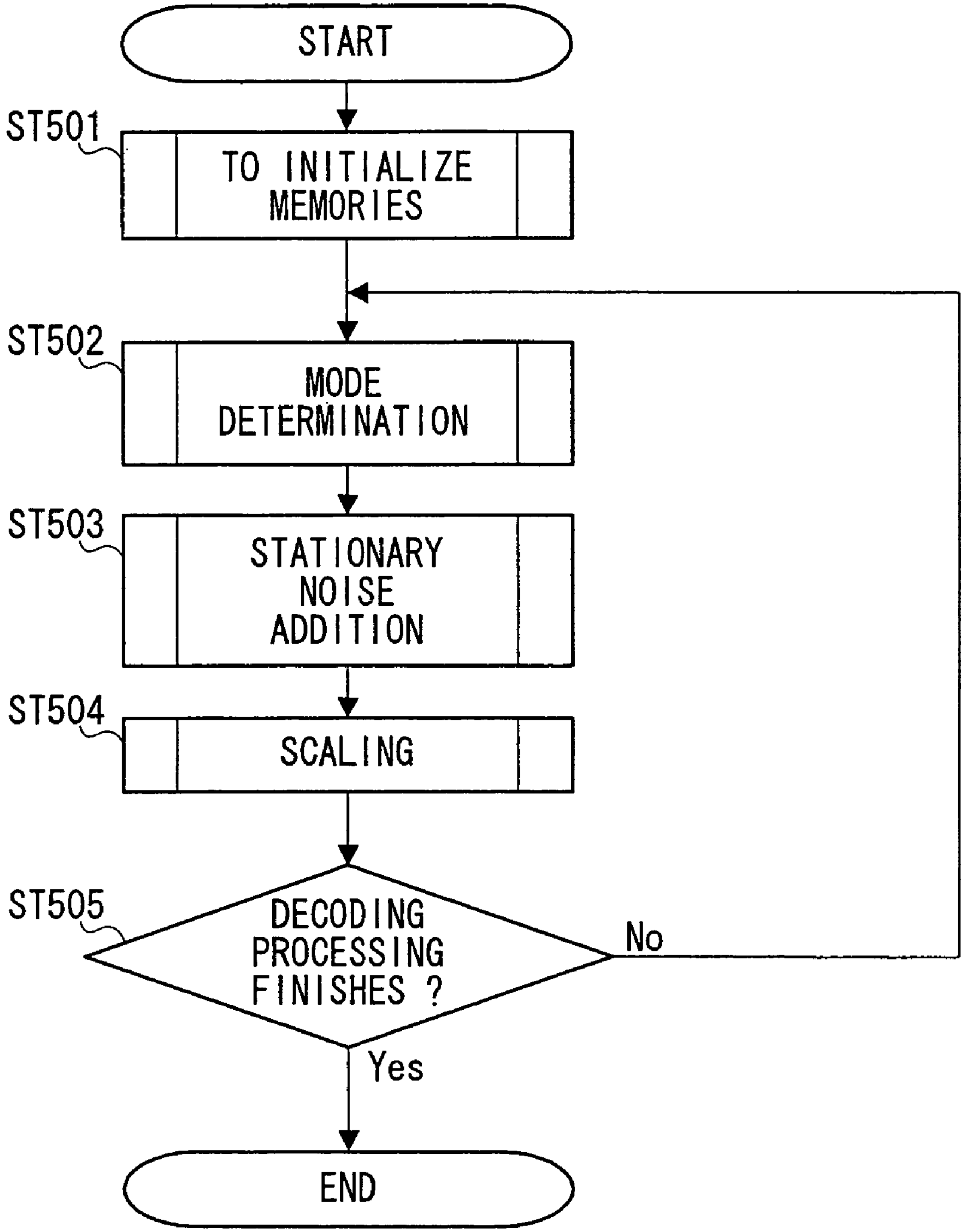
FIG. 8 is a flowchart showing the flow of the speech decoding system.

FIG. 8 is a flowchart showing the flow of the processing of the speech decoding system according to this embodiment. FIG. 8 only shows the flow of processing in stationary noise period detecting apparatus 102 and stationary noise post-processing apparatus 300 shown in FIG. 7, and the processing in code receiving apparatus 100 and speech decoding apparatus 101 are omitted because the processing therein can be implemented using general techniques. The operation of the processing subsequent to speech decoding apparatus 101 in the system will be described below with reference to FIG. 8. First, in ST501, variables stored in the memories are initialized in the speech decoding system according to this embodiment. FIG. 9 shows examples of memories to be initialized and their initial values.

Next, the processing of ST502 to ST505 is performed in a loop, until speech decoding apparatus 101 has no more post-filter output signal (that is, until speech decoding apparatus 101 stops the processing). In ST502, mode determination is made, and it is determined whether the current subframe represents a stationary noise period (stationary noise mode) or a speech period (speech mode). The processing in ST502 will be explained later in detail.

In ST503, stationary noise post-processing apparatus 300 performs processing of adding stationary noise (stationary noise post processing). The flow of the stationary noise post processing in ST503 will be explained later in detail. In ST504, scaling section 303 performs the final scaling processing. The flow of this scaling processing performed in ST504 will be explained later in detail.

In ST505, it is checked whether the current subframe is the last subframe, to determine whether to finish or continue the loop of ST502 to ST505. The loop processing is performed until speech decoding apparatus 101 has no more post-filter output signal (that is, until speech decoding apparatus 101 stops the processing). When processing exits from the loop, all processing of the speech decoding system according to this embodiment terminates.

Figure 10:
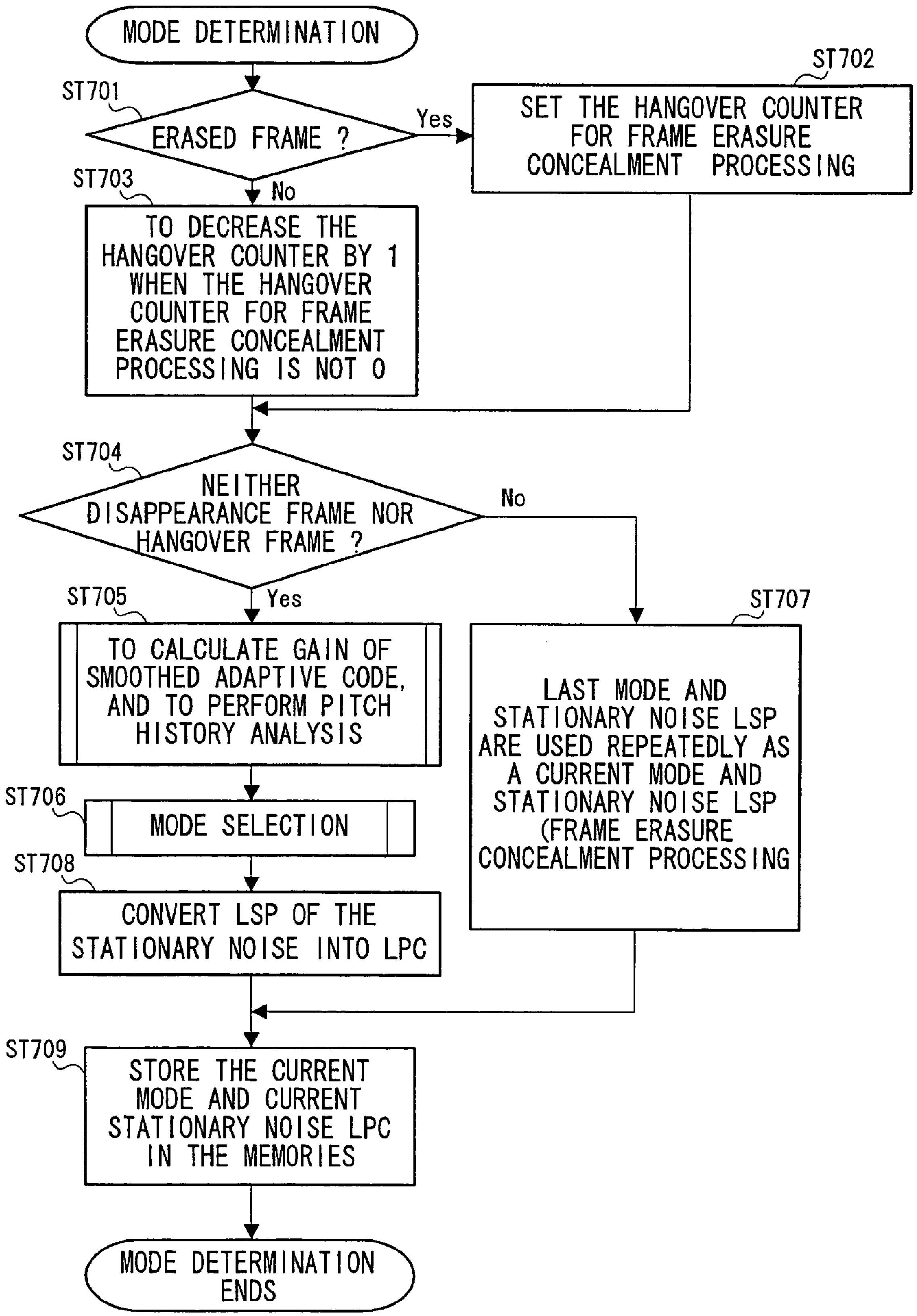
FIG. 10 is a diagram showing the flow of mode determination processing.

The flow of mode determination processing in ST502 will be described below with reference to FIG. 10. First, in ST701, it is checked whether the current subframe is part of frame erasure.

If the current subframe is part of frame erasure, the flow proceeds to ST702, in which a predetermined value (3, in this example) is set on the hangover counter for the frame erasure concealment processing, and then to ST704. When frame erasure occurs, frame erasure concealment processing is still performed on some of the next subframes after the frame erasure even if these subframes are correctly received (no frame erasure occurs, yet those subframes are still subjected to frame erasure concealment processing), and the number of these subframes corresponds to the predetermined value set on the hangover counter.

If the current subframe is not part of frame erasure, the flow proceeds to ST703, where it is checked whether the value on the hangover counter for the frame erasure concealment processing is 0. If the value on the hangover counter is not 0, the value on the hangover counter is decremented by 1, and the flow proceeds to ST704.

In ST704, whether to perform frame erasure concealment processing is determined. If the current subframe is not part of frame erasure or is not in the hangover period immediately after the frame erasure, it is determined not to perform frame erasure concealment processing, and the flow proceeds to ST705. If the current subframe is part of frame erasure or is in the hangover period immediately after the frame erasure, it is determined to perform frame erasure concealment processing, and the flow proceeds to ST707.

In ST705, the smoothed adaptive code gain is calculated and the pitch history analysis is performed as explained in the description of the first embodiment, and the same descriptions will not be repeated. In addition, the pitch history analysis flow has been explained with reference to FIG. 2. After these processing, the flow proceeds to ST706. In ST706, mode selection is performed. The mode selection flow is shown in detail in FIG. 3 and FIG. 4. In ST708, the average LSPs of the signal in the stationary noise period calculated in ST706 are converted into LPCs. The processing in ST708 needs not be performed subsequent to ST706 and needs only to be performed before a stationary noise signal is generated in ST503.

If in ST704 it is determined to perform frame erasure concealment processing, in ST707, setting is made such that the mode and average LPCs of the signal in the stationary noise period in the preceding subframe are maintained in the current subframe, and then the flow proceeds to ST709.

In ST709, the mode information of the current subframe (information showing whether the current subframe represents a stationary noise mode or speech signal mode) and the average LPCs of the signal in the stationary noise period of the current subframe are copied into memories. In addition, it is not always necessary to store information of the current mode in memories in this embodiment. However, this information needs to be kept in a memory if the mode determination result is used in other blocks (e.g. speech decoding apparatus 101). This concludes the description of the mode determination processing in ST502.

Figure 11:
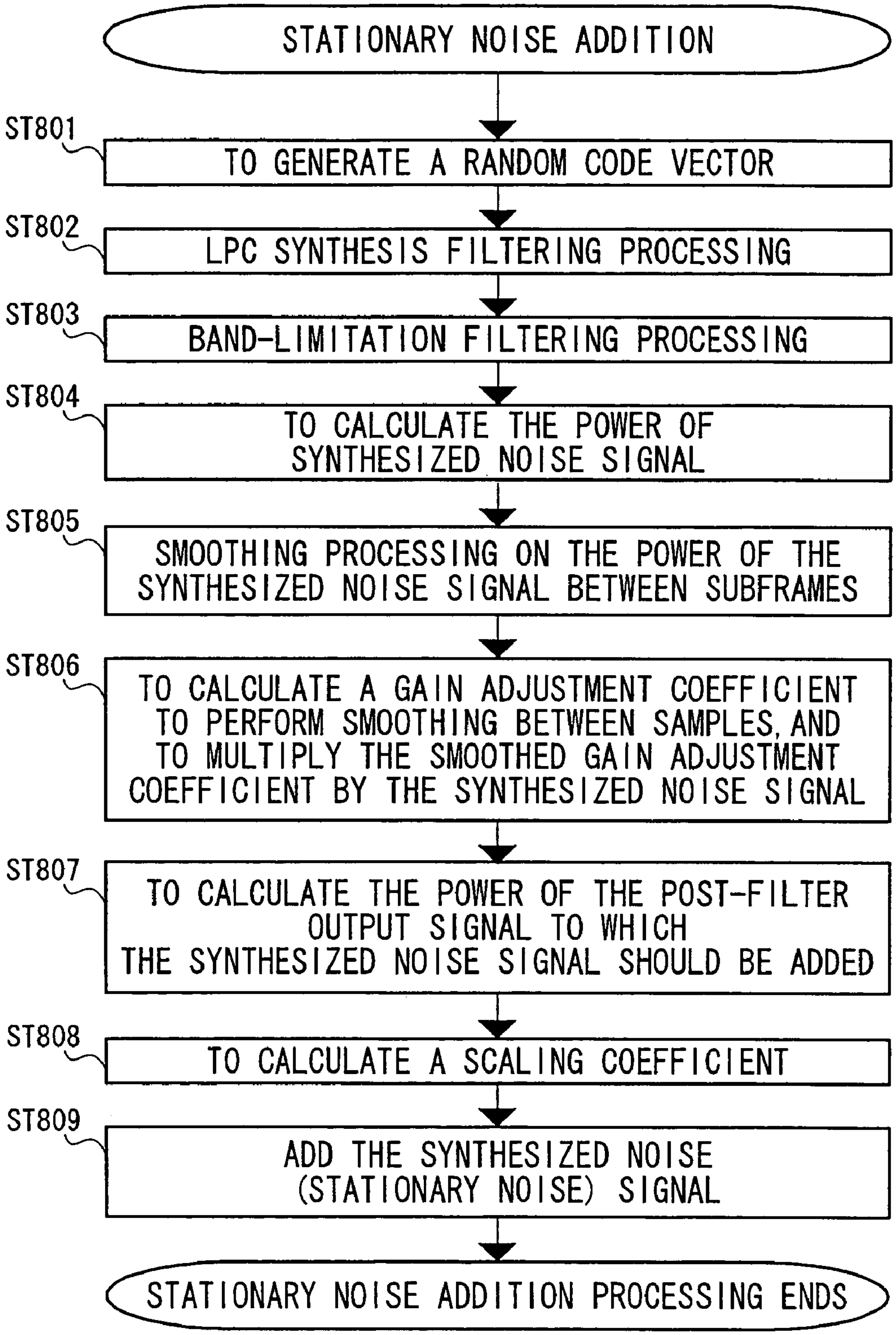
FIG. 11 is a diagram showing the flow of stationary noise addition processing.

The flow of the processing of adding stationary noise in ST503 will be described below with reference to FIG. 11. First, in ST801, excitation generator 210 generates a random vector. Any random vector generation method may be employed, but, as explained in the description of the second embodiment, the method of random selection from fixed codebook 113 provided in speech decoding apparatus 101 is effective.

In ST802, using the random vector generated in ST801 for excitation, LPC synthesis filtering processing is performed. In ST803, the noise signal synthesized in ST802 is subjected to band-limiting filtering processing, so that the bandwidth of the noise signal is coordinated with the bandwidth of the decoded signal from speech decoding apparatus 101. This processing is not mandatory. In ST804, the power of the synthesized noise signal, which is subjected to band limiting processing in ST803, is calculated.

In ST805, the signal power obtained in ST804 is smoothed. The smoothing can be implemented at ease by performing the autoregressive model smoothing processing shown in equation 1 between consecutive frames. The coefficient k for smoothing is determined depending on how smooth the stationary signal needs to be made. Preferably, relatively strong smoothing is performed (e.g. coefficient k is between 0.05 and 0.2), using equation 10.

In ST806, the ratio of the power of the stationary noise signal to be generated (calculated in ST1118) to the signal power, which is inter-subframe smoothed version, from ST805 is calculated as a gain adjustment coefficient, as shown in equation 11. The calculated gain adjustment coefficient is smoothed per sample, as shown in equation 12, and is multiplied with the synthesized noise signal subjected to band-limiting filtering processing in ST803. The stationary noise signal multiplied by the gain adjustment coefficient is further multiplied by a predetermined constant (i.e. fixed gain). This multiplication with a fixed gain is to adjust the absolute level of the stationary noise signal.

In ST807, the synthesized noise signal generated in ST806 is added to the post-filter output signal from speech decoding apparatus 101, and the power of the post-filter output signal, which is after the addition, is calculated.

In ST808, the ratio of the power of the post-filter output signal from speech decoding apparatus 101 to the power calculated in ST807 is calculated as a scaling coefficient using equation 13. The scaling coefficient is used in the scaling processing of ST504 performed after the processing of adding stationary noise.

Finally, adder 202 adds the synthesized noise signal (stationary noise signal) generated in ST806 and the post-filter output signal from speech decoding apparatus 101. This processing may be included in ST807. This concludes the description of the processing of adding stationary noise in ST503.

Figure 12:
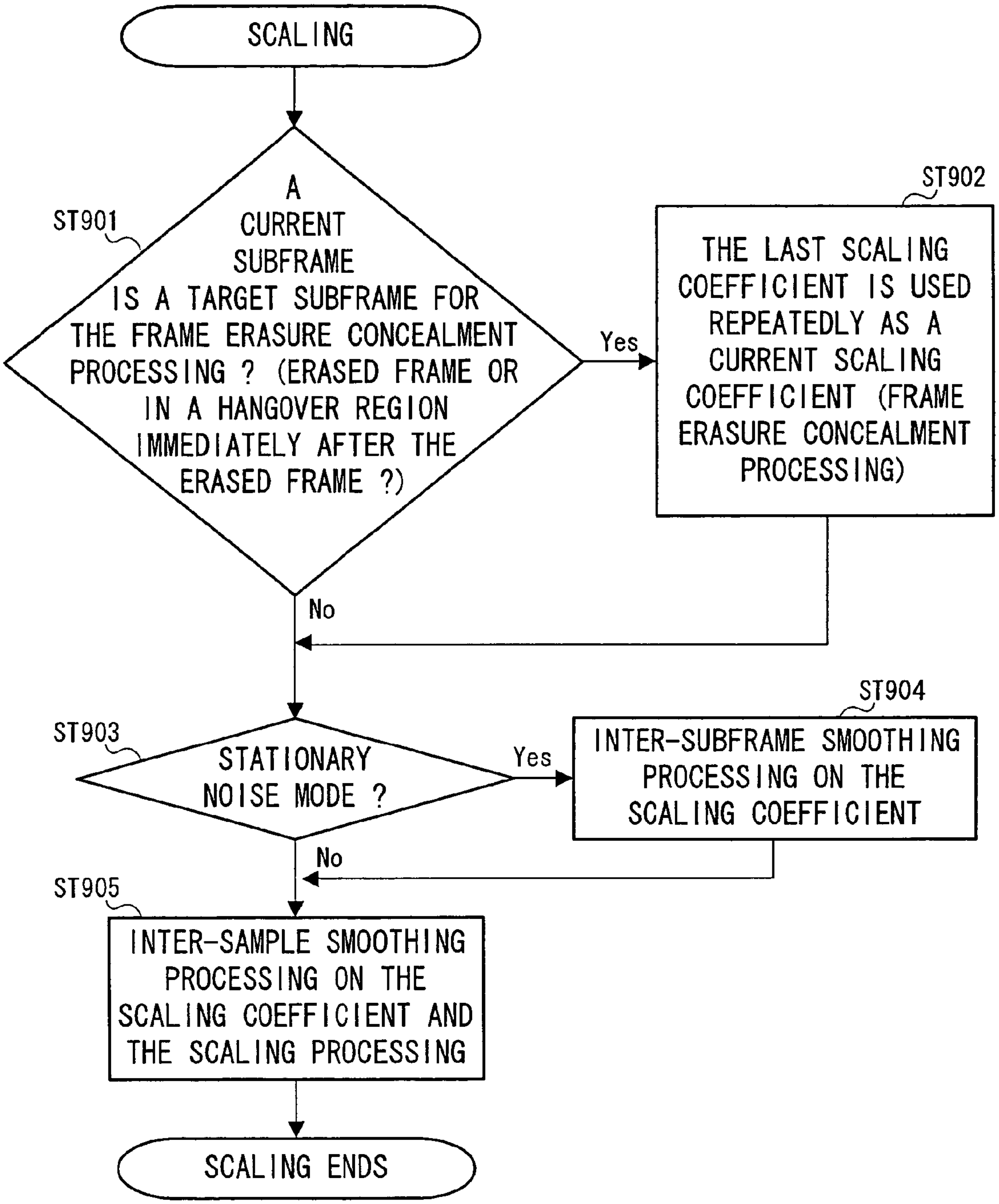
FIG. 12 is a diagram showing the flow of scaling.

The flow in ST504 will be described below with reference to FIG. 12. First, in ST901, it is checked whether the current subframe is a target subframe for frame erasure concealment processing. If the current subframe is a target subframe for frame erasure concealment processing, the flow proceeds to ST902. If the current subframe is not a target subframe, the flow proceeds to ST903.

In ST902, frame erasure concealment processing is performed. That is, setting is made such that the scaling coefficient from the immediately preceding subframe is maintained in the current subframe, and then the flow proceeds to ST903.

In ST903, using the determination result from stationary noise period detecting apparatus 102, it is checked whether the current mode is the stationary noise mode. If the current mode is the stationary noise mode, the flow proceeds to ST904. If the current mode is not the stationary noise mode, the flow proceeds to ST905.

In ST904, the scaling coefficient is subjected to inter-subframe smoothing processing, using equation 1. In this case, the value of k is set at about 0.1. To be more specific, equation 14 is used, for example. The processing is performed to smooth the power variations between subframes in the stationary noise period. After the smoothing, the flow proceeds to ST905.

In ST905, the scaling coefficient is smoothed per sample, and the smoothed scaling coefficient is multiplied by the post-filter output signal to which the stationary noise generated in ST502 is added. The smoothing is performed per sample using equation 1, and, in this case, the value of k is set at about 0.15. To be more specific, equation 15 is used, for example. This concludes the description of the scaling processing in ST504. The post-filter output signal is scaled and added stationary noise.

The equations for smoothing and average value calculation are by no means limited to the equations provided herein, and the equation for smoothing may utilize the average value from certain earlier periods.

The present invention is not limited to the above-mentioned first to fourth embodiments and may be carried into practice in various other forms. For example, the stationary noise period detecting apparatus of the present invention is applicable to any decoder.

Furthermore, although cases have been described with the above embodiments where the present invention is implemented as a speech decoding apparatus, the present invention is by no means limited to this, and, for example, an equivalent speech decoding method may be implemented in software. For instance, a program for executing the speech decoding method may be stored in a ROM (Read Only Memory) and executed by a CPU (Central Processor Unit). It is equally possible to store a program for executing the speech decoding method in a computer readable storage medium, store this storage medium in a RAM (Random Access Memory), and operate the program on a computer.

In view of the herein-contained descriptions of embodiments, the present invention evaluates the degree of periodicity of a decoded signal using the adaptive code gain and pitch period, and, based on the degree of periodicity, determines whether a subframe represents a stationary noise period. Accordingly, if a signal arrives that is stationary but is not noisy (e.g. a sine wave or a stationary vowel), it is still possible to correctly determine the state of the signal.

This application is based on Japanese Patent Application No. 2000-366342, filed on Nov. 30, 2000, the entire content of which is expressly incorporated by reference herein.

INDUSTRIAL APPLICABILITY

The present invention is suitable for use in mobile communication systems and in packet communication systems, including internet communications systems and speech decoding apparatuses.

The invention claimed is:

1. A stationary noise period detecting apparatus comprising:

a pitch history analyzer that classifies pitch periods of a plurality of past subframes into one or more classes in a way in which different pitch periods are classified to different classes, groups classes where a difference between the pitch periods classified to those classes is less than a predetermined first threshold into one group when there are a plurality of classes, and obtains a number of the groups as an analysis result; and a determiner that determines that a signal period where the analysis result is less than a predetermined second threshold is a speech period.

2. The stationary noise period detecting apparatus according to claim 1, further comprising:

an average LSP calculator that calculates an average of LSP vectors of a signal of a stationary noise period;

a distance calculator that calculates a distance between an LSP vector in a current subframe and the average LSP calculated by the average LSP calculator; and a tentative determiner that tentatively determines that a period where a fluctuation amount of an LSP vector between subframes is less than a predetermined third threshold and the distance calculated by the distance calculator is less than a predetermined fourth threshold, is a stationary noise period, wherein:

the determiner performs determination processing only when the tentative determiner determines that a period is a stationary noise period.

3. The stationary noise period detecting apparatus according to claim 2, further comprising:

a smoother that smoothes adaptive codebook gains between subframes; and a signal power calculator that calculates signal power of the stationary noise period determined by the tentative determiner, wherein:

the determiner determines that a signal period where the analysis result is greater than the second threshold, the smoothed adaptive codebook gains are less than a predetermined fifth threshold, and the signal power calculated by the signal power calculator is less than a value obtained by multiplying average power of a background noise signal by a predetermined value, is a stationary noise period.

4. A stationary noise period detection method comprising:

a pitch history analyzing step of classifying pitch periods of a plurality of past subframes into one or more classes in a way in which different pitch periods are classified to different classes, grouping classes where a difference between the pitch periods classified to those classes is less than a predetermined first threshold into one group when there are a plurality of classes, and obtaining a number of the groups as an analysis result; and a determining step of determining that a signal period where the analysis result is less than a predetermined second threshold is a speech period.

5. The stationary noise period detection method according to claim 4, further comprising:

an average LSP calculating step of calculating an average of LSP vectors of a signal of a stationary noise period;

a distance calculating step of calculating a distance between an LSP vector in a current subframe and the average LSP calculated by the average LSP calculator; and a tentative determining step of tentatively determining that a period where a fluctuation amount of an LSP vector between subframes is less than a predetermined third threshold and the distance calculated by the distance calculator is less than a predetermined fourth threshold, is a stationary noise period, wherein in the determining step, determination processing is performed only when a period is determined to be a stationary noise period in the tentative determining step.

6. The stationary noise period detection method according to claim 5, further comprising:

a smoothing step of smoothing adaptive codebook gains between subframes; and a signal power calculating step of calculating signal power of the stationary noise period determined in the determining step, wherein:

in the determining step, a signal period where the analysis result is greater than the second threshold, the smoothed adaptive codebook gains are less than a predetermined fifth threshold, and the signal power calculated in the signal power calculating step is less than a value obtained by multiplying average power of a background noise signal by a predetermined value, is determined to be a stationary noise period.

* * * * *

UNITED STATES PATENT AND TRADEMARK OFFICE

CERTIFICATE OF CORRECTION

PATENT NO. : 7,478,042 B2
APPLICATION NO. : 10/432237
DATED : January 13, 2009
INVENTOR(S) : Hiroyuki Ehara et al.

It is certified that error appears in the above-identified patent and that said Letters Patent is hereby corrected as shown below:

On the title page: Item (73) Assignee currently reads:

(73) Assignee: Panasonic Corporation, Osaka (JP)

and should read:

(73) Assignees: Panasonic Corporation, Osaka (JP); and

Nippon Telegraph and Telephone Corporation, Tokyo (JP)

Signed and Sealed this

Thirteenth Day of July, 2010

David J. Kappos

David J. Kappos
*Director of the United States Patent and Trademark Office*